United States Patent Office 3,459,722
Patented Aug. 5, 1969

3,459,722
FLUORINE-CONTAINING POLYMER
Murray Zanger, 512 Devon Road,
Havertown, Pa. 19083
No Drawing. Filed Oct. 26, 1965, Ser. No. 505,241
Int. Cl. C08f 27/02, 27/18
U.S. Cl. 260—89.5                                  6 Claims

ABSTRACT OF THE DISCLOSURE

There is disclosed a new fluorine-containing polymer which is useful for treating fabrics, yarns and the like to render them repellent to oil and water; it is shown that said polymer can be made (1) by reacting (A) hexafluoropropyleneoxide dimer or similar perfluoro compound with (B) a suitable polymer, for example a polymer of a hydroxyalkyl methacrylate or acrylate so that all or part of the OH groups of (B) become groups having the formula

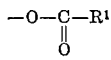

where $R^1$ is the radical

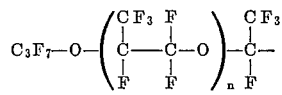

or (2) by reacting (A) with a monomer of said hydroxyalkyl compound and then polymerizing the resulting compound.

---

This invention relates to a new fluorine-containing polymer which is useful in the treatment of fabrics and other fibrous or absorbent articles to render them repellent to oil and water. The invention also relates to the preparation of the novel polymer and to the articles which have been treated with it.

Expressed broadly, the polymer of the present invention is a fluorine-containing polymer having the structural formula $$(R^1{-}\underset{\underset{O}{\|}}{C}{-}X)_p(HX)_{m-p}{-}R^2$$

wherein:

$R^1$ is the radical

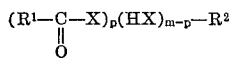

$C_3F_7{-}$ being $F_3C{-}CF_2{-}CF_2{-}$ or

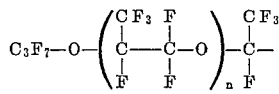

and $n$ being an integer of 0 to 6 inclusive;
X is oxygen or nitrogen;
$R^2$ is a polymeric radical having a valence of $m$, and $m$ and $p$ are integers of at least 1.

One process for preparing the polymer of this invention comprises reacting

A. a perfluoro compound of the formula

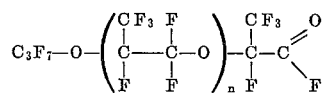

wherein $C_3F_7{-}$ and $n$ are as defined above with

B. a polymer containing at least one radical from the group consisting of —OH and —NH.

In carrying out this process, all or part of the —XH(—OH or —NH) groups of polymer (B) become groups having the formula

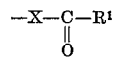

Another process for preparing the novel polymer comprises reacting a perfluoro compound as described in (A) above with a monomer containing at least one radical from the group consisting of —OH and —NH, and then polymerizing the resulting compound.

In the latter process, one or more monomers copolymerizable with the resulting compound can be present during the polymerization step. The resulting interpolymer preferably contains at least 50% by weight of the units from the perfluoro compound when the product is to be used for rendering fabrics and other articles repellent to oil and water. Among the useful comonomers are chloroprene, butadiene, styrene, alpha methyl styrene, and alkyl acrylates and alkyl methacrylates in which the alkyl group contains 1–8 carbon atoms.

It can be seen from the above description of the invention that the novel polymer has the structure which results from replacing with

groups the H atoms of all or part of the —XH groups of a polymer having the formula $(HX)_m{-}R^2$. When the H atoms of all the —XH groups originally present are so replaced, the structural formula of the novel polymer, of course, is simply

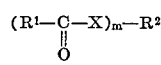

In a preferred embodiment of the invention, the perfluoro compound (A) used in preparing the polymer has the formula

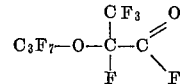

This compound can be referred to as perfluoro-2-propoxypropionyl fluoride or hexafluoropropylene oxide ("HFPO") dimer. Thus, in this embodiment the radical $R^1$ of the novel polymer has the formula

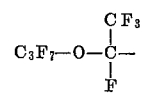

which can be referred to as radical $R^4$. Either or both of the $C_3F_7{-}$ structures set forth above can be used, of course the compound having the iso form is referred to as perfluoro-2-isopropoxypropionyl fluoride $$[(CF_3)_2CFOCF(CF_3)COF]$$

One preferred polymer of this invention is produced by reacting (A) "HFPO" dimer with (B) poly(vinyl alcohol).

This polymer therefore has the structure which results from replacing with

groups the H atoms of at least part of the —OH groups of poly(vinyl alcohol). The preparation of this polymer takes place as follows:

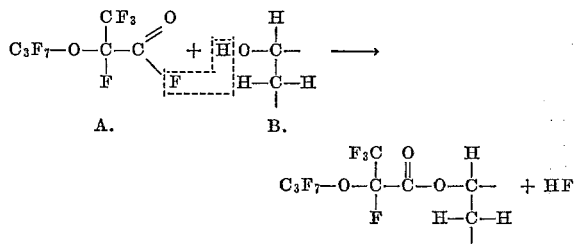

Another preferred polymer of this invention is produced by reacting (A) the "HFPO" dimer with (B) cellulose, the resulting polymer having the structure which results from replacing with

groups the H atoms of at least part of the —OH groups of cellulose.

Another preferred polymer of this invention is produced by reacting (A) the "HFPO" dimer with (B) poly(ethylene imine), the resulting polymer having the structure which results from replacing with

groups the H atoms of at least part of the —NH groups of poly(ethylene imine).

Another preferred polymer of this invention is produced by either of the following two processes:

I. Reacting (A) the "HFPO" dimer with (B) poly(hydroxyethyl methacrylate), the resulting polymer having the structure which results from replacing with

groups the H atoms of at least part of the —OH groups of poly(hydroxyethyl methacrylate); or II. Reacting (A) the "HFPO" dimer with (B) the monomer hydroxyethyl methacrylate to form a fluorine-containing ester, and then polymerizing the ester to form the fluorine-containing polymer, the structure of the latter being as set forth in I above.

Other preferred polymers of the present invention are produced by reacting the "HFPO" dimer with a suitable replacement for component (B) (which will be apparent to those skilled in the art) in processes I and II described above to obtain polymers having the structure which results from replacing with

groups the H atoms of at least part of the —OH groups of poly(hydroxyalkyl acrylates), and poly-hydroxyalkyl methacrylates) other than the one described above, in which the alkyl group contains 1–8 carbon atoms.

In the light of the present disclosure, skilled polymer chemists will be able to select monomers and polymers other than those mentioned above in which H atoms can be removed from —OH groups or —NH groups by reaction (of the monomers and polymers) with the perfluoro compound (A) described above to produce other specific fluorine-containing polymers in accordance with the present invention.

When employing the process wherein the perfluoro compound (A) is reacted with an —OH or —NH containing monomer followed by polymerizing the resulting fluorocarbon monomer (either alone or blended with a comonomer as explained above), the latter step is preferably carried out by emulsion polymerization, following known general practice in this technique. The polymer can also be formed by known bulk, solution and organosol techniques of polymerization.

A convenient emulsion polymerization method comprises emulsifying the monomer or monomer mixture in a water solution of a suitable surface active agent, heating the emulsion under nitrogen in a conventional polymerization apparatus to above 40–70° C., adding at least 0.1% (by weight of monomer) of a radical-producing catalyst (e.g. hydrogen peroxide), and keeping the mixture at about 40–70° C. for at least an hour to complete the polymerization reaction. The resulting aqueous dispersion of the novel fluorine-containing polymer can be applied directly to the articles to be treated.

Perfluoro compound (A) can be prepared according to the procedure described in French Patent 1,359,426, granted Mar. 16, 1964. For example, it can be prepared by contacting hexafluoropropylene oxide with an organic solvent dispersion of a monovalent metal fluoride or a tetramethyl ammonium halide at —80 to +50° C., said solvent containing an atom of O, N or S and being a liquid at the reaction temperature, and capable of dissolving perfluoropropoxide to a concentration of at least 0.01 weight percent.

The fluorine-containing polymer of this invention is useful as a film-forming polymer either by itself or in combination with other materials; it is particularly useful for treating fabrics, yarns, suede, paper, or other fibrous or absorbent articles to render them stain-resistant and repellent to oil and water. The polymer by itself or in combination with other materials (e.g. another polymer, a surfactant and/or a wax) can be dispersed in water or an organic solvent and applied to the articles to be treated by known impregnating or coating methods. The treated articles are dried at room temperature or at an elevated temperature, after which they can be ironed if desired either with a steam iron or a dry iron.

The examples which follow are given for the purpose of illustrating the invention. All quantities shown are on a weight basis unless otherwise indicated.

Example I

In this example "HFPO" dimer (perfluoro-2-propoxypropionyl fluoride) is reacted with hydroxyethyl methacrylate, the H atom of the —OH group of the latter being replaced with an

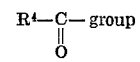 group and the resulting fluorocarbon ester monomer is polymerized to form one of the preferred polymers of the present invention.

The fluorocarbon ester monomer is prepared by (1) mixing together in a vessel 32 parts of "HFPO" dimer, 12 parts of hydroxyethyl methacrylate and 25 parts of pyridine, (2) stirring the mixture for two hours at 25° C. to complete the ester-forming reaction, (3) pouring the contents of the vessel into 500 parts of water in a beaker, (4) transferring the water-insoluble portion that settles to complete the ester-forming reaction, (3) pouring the washing it five times with water by vigorous agitation within the funnel, and (5) separating 35 parts of the washed ester monomer that settles to the bottom of the funnel as a pale yellow liquid.

The reaction during preparation of the ester monomer is illustrated as follows:

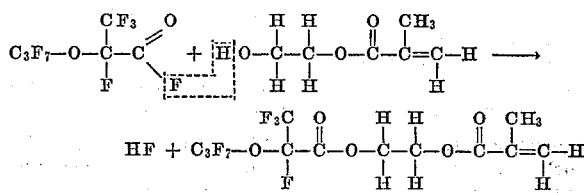

An infrared study of the ester monomer shows carbonyl peaks at 5.6 and 5.8 microns, representing the perfluoro and methacrylate absorptions respectively. The absence of residual hydroxyl absorption indicates substantially complete conversion of the —OH containing monomer to the fluorocarbon ester. There are characteristic C–F absorptions at 7.5 to 9.0, 9.6 and 10.1 microns.

A fluorine-containing polymer is prepared from the ester monomer by an emulsion polymerization procedure wherein (1) 34.5 parts of the monomer are emulsified in a water solution of a quaternary ammonium salt cationic surfactant of the n-alkyl trimethyl ammonium chloride type, the alkyl being predominantly dodecyl (5 parts of the surfactant in 160 parts of water), (2) after adding 0.1 part of ammonium persulfate, the emulsion is heated under nitrogen while stirring in a conventional polymerization apparatus to 50° C., (3) 0.05 part of sodium bisulfite and 1 part per million of ferrous sulfate (based on the total weight of the mixtures) are added to the emulsion, (4) the resulting mixture is stirred while kept under nitrogen at 53° C. for five hours to complete the polymerization reaction. The mixture is cooled to 25° C., allow to stand for ten hours and filtered through a cheese cloth to remove any coagulum that has formed. The dispersion now has a solids content of 16.2%.

The resulting aqueous dispersion of the fluorine-containing polymer is applied to a cotton jacket by immersing and agitating the jacket in enough of the dispersion to deposit two parts of the polymer per 100 parts by weight of the fabric (dry basis). After the treated jacket is dried in an ordinary home-type clothes drier and ironed with an ordinary home-type steam iron, it is much more stain-resistant and repellent to oil and water than before it was treated with the polymer of this invention.

Example II

The stain-resistance and oil and water repellence of a tablecloth made of cotton and polyester yarns are substantially improved by treatment with a fluorine-containing polymer of this invention prepared by reacting HFPO dimer with poly(vinyl alcohol) having a weight average molecular weight of about 135,000 and containing about 3070 hydroxyl groups per molecule.

The treating composition is prepared by (1) charging a reaction vessel equipped with a stirrer, dropping funnel, reflux condenser and drying tube with 4 parts of poly(vinyl alcohol) as described above, 24 parts of pyridine and 15 parts of HFPO dimer, the latter added gradually from the dropping funnel, (2) heating the mixture at reflux temperature for 1¼ hours to bring about the reaction illustrated herein above, (3) pouring the cooled contents of the vessel into 300 parts of water in a beaker, (4) transferring the water-insoluble solids (17 parts of polymer) that settles to the bottom of the beaker to the filter paper of a vacuum filter apparatus where the polymer is washed five times with water and twice with acetone, and (5) dissolving 1 part of the resulting washed and dried yellow solid fluorine-containing polymer in 100 parts of trichlorotrifluoroethane. Substantially all of the —OH groups of the poly(vinyl alcohol) have become groups having the formula

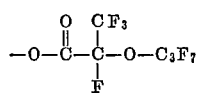

Enough of the resulting treating composition is applied to the tablecloth by means of a doctor-knife coating apparatus to deposit 2 parts of the polymer per 100 parts by weight of the fabric (dry basis). The treated tablecloth is hung on a clothesline to dry at 25° C. When subjected to normal use wherein water and various food substances are spilled on it, the treated tablecloth is found to be resistant to staining and repellent to aqueous and oily materials.

Example III

Results similar to those described in Example 2 are obtained when tablecloths, napkins and cotton blouses are made from bolts of various grades of fabric which have been treated with a fluorine-containing polymer of this invention prepared by reacting HFPO dimer with cellulose (molecular weight over 100,000).

The treating composition is prepared by (1) charging a reaction vessel as described in Example 2 with a dispersion of 4 parts of white cellulose flock in 40 parts of pyridine and 40 parts of HFPO dimer, the latter added gradually from a dropping funnel, (2) heating the mixture at reflux temperature for 2½ hours to bring about the reaction wherein substantially all the —OH groups of the cellulose become groups having the formula

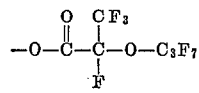

(3) pouring the cooled contents of the vessel into 300 parts of water in a beaker, (4) transferring the water-insoluble solids (38 parts of small rubbery spheres of polymer) that settle to the bottom of the beaker to the filter paper of a vacuum filter apparatus where the polymer is washed three times with hot water, three times with cold water and twice with acetone, (5) extracting the polymer in a Soxhlet flask with hot solvent (trichlorotrifluoroethane) and collecting and drying the portion dissolved by the hot solvent, and (6) dissolving 1 part of the resulting fluorine-containing polymer in 200 parts of trichlorotrifluoroethane.

Enough of the resulting treating composition is applied to the fabric by means of a doctor-knife type of continuous coating apparatus to deposit 2 parts of the polymer per 100 parts by weight of the fabric (dry basis). The treated fabric is passed through a 100° C. oven to dry it.

When a layer of the treating composition is doctor-knifed onto a glass plate and dried in a heat-zone, a clear, tough oil and water repellent polymer film is obtained.

Example IV

Articles made from cotton fabric are rendered hydrophobic and oleophobic by treatment with a fluorine-containing polymer of this invention prepared by reacting HFPO dimeter with poly(ethylene imine) having a molecular weight of about 3000.

The treating composition is prepared by (1) charging a reaction vessel as described in Example 2 with a solution prepared by mixing 20 parts of a 50% aqueous solution of poly(ethylene imine) and 10 parts sodium hydroxide with 40 parts water, (2) adding to the vessel with stirring at 5° C. 130 parts ethyl acetate; (3) adding to the vessel gradually from a dropping funnel with stirring at 5° C. a solution of 75 parts HFPO dimer in 140 parts trichlorotrifluoroethane, and continuing the stirring at 5° C. for one hour after the solution is added, the H atoms of about 70% of the —NH groups of the poly(ethylene imine) thereby being replaced with

groups; (4) removing the polymer-containing portion (ethyl acetate solution) from the bottom of the vessel and washing it several times with water; (5) removing any water present in the solution by shaking it with anhydrous magnesium sulfate and passing the water-free solution through a filter paper; (6) evaporating the ethyl acetate to obtain the dry solid fluorine-containing polymer; (7) dissolving 3 parts of the polymer in 100 parts acetone; (8) passing the solution through a filter paper to remove any insoluble matter; and (9) adjusting the polymer content of the solution to 2%.

The cotton articles are rendered hydrophobic and oleophobic by dipping them in the resulting 2% polymer solution followed by drying them overnight (16 hours) at 25° C.

Usually the fluorine-containing polymer of this invention has an $R^1$ radical content of at least 40% by weight to insure obtaining satisfactory oil and water repellent properties in the product.

In the description of the fluorine-containing polymer given herein, $R^2$ is described as "a polymeric radical having a valence of $m$." Although this use of the term "valence" might not be exactly in accordance with some persons' conception of the term, the meaning intended herein will be clear to one skilled in the art. For example, it is apparent that an embodiment of this polymer has the structure which results from replacing with

groups the H atoms of all ($m$) or part ($p$) of the —OH groups of a polymer having the formula $(HO)_m$—$R^2$. Thus, the "valence of $m$" mentioned herein with respect to radical $R^2$ obviously has a value equal to the number of —OH groups originally present in the polymer from which radical $R^2$ is derived.

I claim:

1. A polymer having the structural formula $$(R^1-\underset{\underset{O}{\|}}{C}-O)_p(HO)_{m-p}-R^2$$

wherein $R^1$ is the radical

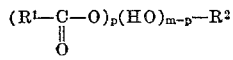

$C_3F_7$— being $F_3C$—$CF_2$—$CF_2$— or

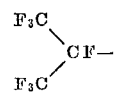

and $n$ being an integer of 0 to 6 inclusive;

$R^2$ is a polymeric radical having a valence of $m$, and having the formula which results from removal of the H atoms from at least part of the —OH groups attached to the backbone of a polymer seleced from the group consisting of poly(hydroxyalkyl acrylates) and poly(hydroxyalkyl methacrylates) in which the alkyl group contains 1–8 carbon atoms; and $m$ and $p$ are integers of at least one.

2. A polymer according to claim 1 wherein $n$ of $R^1$ is 0.

3. An article comprising a fibrous material coated with the polymer defined in claim 1, said fibrous material being selected from the group consisting of fabrics, yarns, suedes and papers.

4. A process for preparing a polymer as defined in claim 1 which comprises reacting (A) a perfluoro compound of the formula

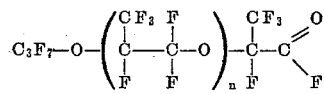

$C_3F_7$— being $F_3C$—$CF_2$—$CF_2$— or

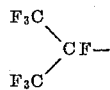

and $n$ being an integer of 0 to 6 inclusive, with (B) a polymer selected from the group consisting of poly(hydroxyalkyl acrylates) and poly(hydroxyalkyl methacrylates) in which the alkyl group contains 1–8 carbon atoms.

5. A process according to claim 1 wherein $n$ is 0.

6. A process for preparing a polymer as described in claim 1 which comprises reacting (A) a perfluoro compound of the formula

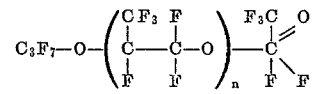

$C_3F_7$— being $F_3C$—$CF_2$—$CF_2$— or

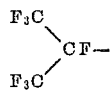

and $n$ being an integer of 0 to 6 inclusive, with (B) a monomer selected from the group consisting of hydroxyalkyl acrylates and hydroxyalkyl methacrylates in which the alkyl group contains 1–8 carbon atoms, and then polymerizing the resulting compound.

References Cited

UNITED STATES PATENTS

| | | | |
|---|---|---|---|
| 3,102,103 | 8/1963 | Ahlbrecht et al. | 260—29.6 |
| 3,238,235 | 3/1966 | Hauptschein et al. | 260—29.6 |

FOREIGN PATENTS

| | | |
|---|---|---|
| 919,324 | 2/1963 | Great Britain. |

HARRY WONG, JR., Primary Examiner

U.S. Cl. X.R.

117—140, 142, 155; 260—2, 28, 29, 83, 86, 91, 226, 544, 823, 873, 900